UNITED STATES PATENT OFFICE.

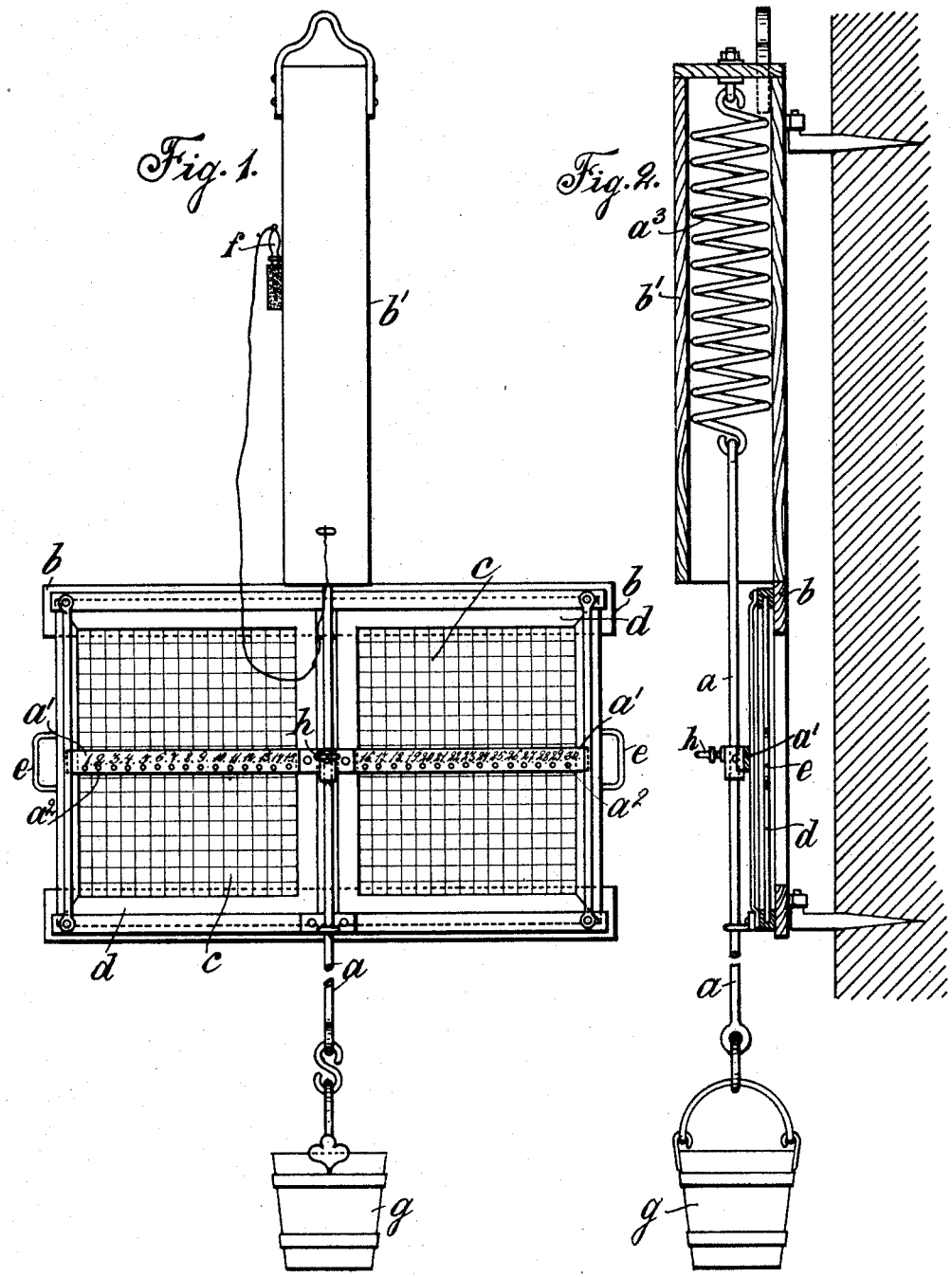

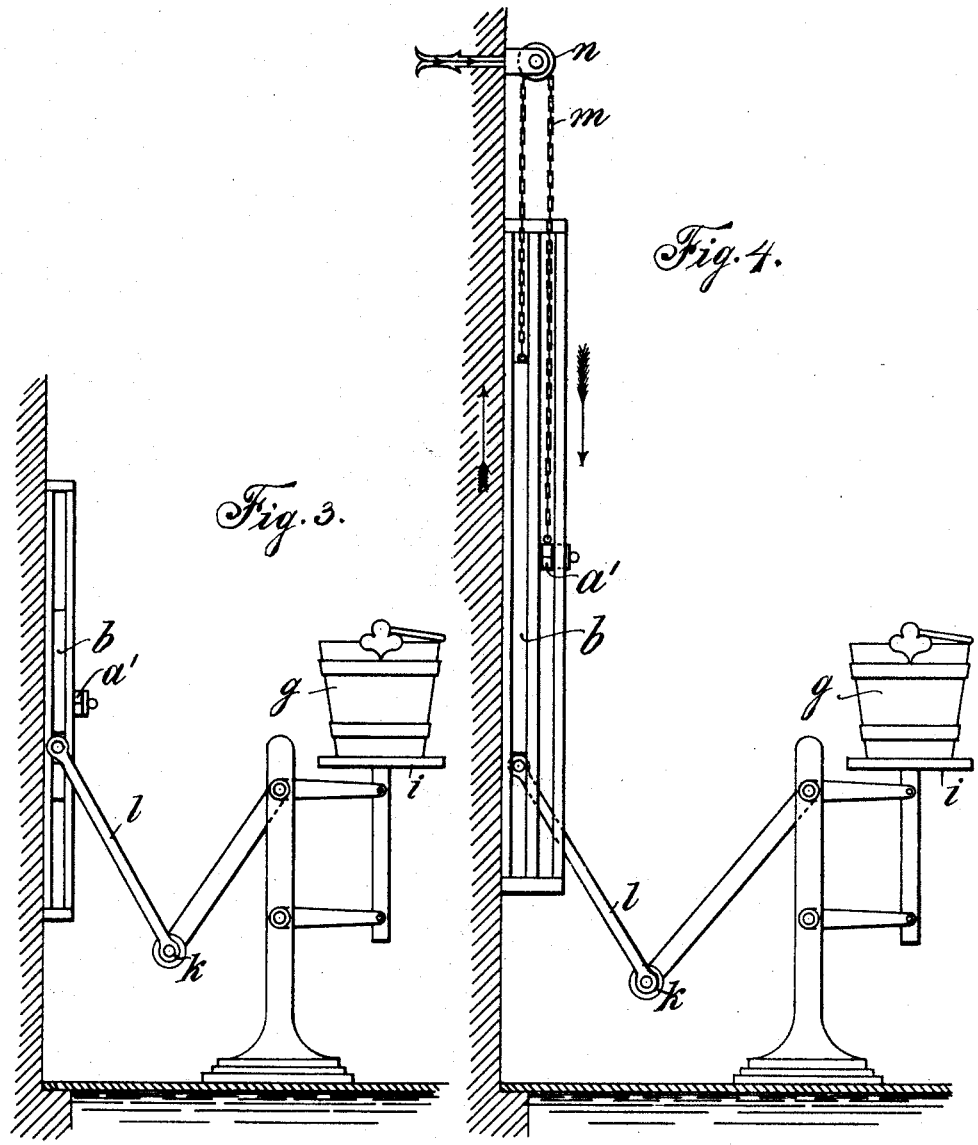

OTTOCAR LINDEMANN, OF HASSERODE, GERMANY.

CONTROLLING AND REGISTERING SCALE.

SPECIFICATION forming part of Letters Patent No. 587,100, dated July 27, 1897.

Application filed October 14, 1896. Serial No. 608,862. (No model.) Patented in Germany July 31, 1895, No. 85,407.

*To all whom it may concern:*

Be it known that I, OTTOCAR LINDEMANN, residing in Hasserode-on-the-Harz, Germany, have invented certain new and useful Improvements in Controlling and Registering Scales for Goods to be Received and Delivered, (for which I have received German Letters Patent No. 85,407, granted July 31, 1895,) of which the following is a specification.

This invention relates to weighing and registering apparatus and aims to provide improved apparatus of this character which can be conveniently used for recording the successive quantities of products to be furnished to or by a number of parties, so that the amount for each party can be readily recorded and a record of all the amounts can be easily kept.

There are many cases where it is desirable to have a sure, easy, and quick control of the quantities of goods received or delivered. Such cases occur in factories, in agriculture, in households, in the administration of storage-rooms, and elsewhere, and, for example, in a dairy establishment, where it is especially desirable to record the quantity of milk furnished, for example, by each cow and the total of all milk supplied in such manner that the records from time to time can be preserved as a complete record of the business of the establishment.

My present invention provides certain improvements which will be hereinafter described as applied to apparatus especially applicable for use in a dairy.

In the accompanying drawings, which show certain adaptations of my present improvements, Figure 1 is a front elevation of an apparatus embodying the preferred form of the invention. Fig. 2 is a side elevation thereof, partly in vertical mid-section. Fig. 3 is a side elevation showing a modification in which an adjustable chart and stationary bar are employed, and Fig. 4 shows in side elevation another modification in which both the chart and bar are movable.

Referring to Figs. 1 and 2, I will first describe the preferred form of my invention as therein shown. The apparatus here shown consists, essentially, of a spring-balance $a^3$, having a hooked bar $a$, carrying the receiver or gaged vessel $g$ for receiving the product to be weighed, the balance being provided with a horizontal bar or indicator $a'$, which is adjustably clamped to the vertical bar $a$ by a screw-clamp $h$. The bar $a'$ is provided with a number of holes $a^2$. Behind the rod $a$ and the bar $a'$ a frame $b$ is secured, having a groove for receiving a second frame $d$, into which a sheet of paper $c$ can be stretched for receiving a record of the different measurements, this record being made on the paper at or through one of the holes in the horizontal bar.

One or more frames $d$, each having a chart $c$, may be employed, two being shown in Fig. 1, where each frame is provided with a handle $e$, by which it can be pushed laterally into the frame $b$. The paper sheet $c$ is graduated or ruled, that shown being provided with vertical columns equal in number to the number of holes provided in the cross-bar $a'$ and with a number of equidistant horizontal columns or lines, which latter represent the scale of the weights of the spring-balance. The holes in the cross-bar are provided with numerals corresponding with the vertical columns.

In use the bar $a'$ is adjusted on the rod $a$ after the vessel $g$ has been applied, so that when the vessel is empty the bar $a'$ will stand with its holes opposite the horizontal line on the chart which constitutes the zero-line. Then in order to measure the milk coming from a special cow this milk is brought to the apparatus and poured into the vessel $g$, or it is poured in this vessel before the latter is hooked to the scale. The scale will yield to the weight of the milk, moving the horizontal bar to a point opposite the chart corresponding with the weight of the milk. It is then sufficient to make a mark with a pencil or needle on the paper or with a stamp, making the mark by introducing either of these through that hole $a^2$ which carries the number corresponding to the number of the cow whose milk is being weighed. The same manipulation is repeated for the measurement of the milk of each successive cow until that of all has been measured, whereupon the paper chart gives an exact compilation of the quantity of milk furnished by each individual cow and a ready means for determining the total supplied by all.

In order to avoid the necessity for providing a fresh chart for each operation of milking, different markers may be used for the morning, noon, and evening measurements, so the quantities furnished at these different times can be distinguished from each other. Marking needles or stamps having different cross-sections may be employed for the different operations, or different colors may be used.

It is evident that the balance can be arranged in any suitable way and operated on any suitable principle, and that it is immaterial whether the spring $a^3$ is compressed or extended by the weight or whether the frame $b$ is arranged above or below the spring.

Instead of moving the cross-bar connected to the scales relatively to a fixed chart, the bar can be made a fixed part, and the chart can be connected to the scales so that it will be moved relatively to the bar corresponding to the weight of the charge, whereupon each weight can be marked in the respective column of the chart by using the bar as a marking-guide. Scales provided with this construction are shown in Fig. 3, in which the vessel $g$ is placed on a table $i$ of the scales, which table is carried on a counterweighted scale beam or lever $k$, which is connected by a link $l$ with the movable chart-frame $b$, carrying the chart at rear of the stationary cross-bar $a'$, so that the chart is shifted up and down behind the bar according to the weight in the vessel $g$. In order to find the tare of the vessel the bar may be adjusted to stand opposite zero on the chart when the vessel $g$ is empty.

In order to produce a greater relative displacement between the bar $a$ and the frame $b$, they may be made both movable and may be connected in such manner that they displace each other automatically in opposite directions when the scales are acting. Such a construction is shown in Fig. 4, which is essentially the same as the one shown in Fig. 3, except that the frame $b$ is connected with a movable cross-bar $a'$ by means of a suitable number of chains $m$, running over pulleys $n$. The cross-bar working in slides $o$ is lowered during the action of the scales simultaneously as the frame $b$ is raised, and vice versa, the movements of the two parts being equal in extent and opposite in direction. Thus the relative motion between the bar and chart is greater, and consequently the column on the paper corresponding to the unit of weight is greater and fractional parts of the weight can be marked on the paper with greater accuracy. It is evident that it is immaterial whether spring or weight balances be employed with any of these constructions.

It will be seen that my invention provides improvements which can be readily and advantageously availed of, and it will be understood that the invention can be employed according to such adaptations and for such uses as circumstances or the judgment of those skilled in the art may dictate without departing from the spirit of the invention.

What I claim is—

1. In registering apparatus for weighing different quantities of a product, the weighing-scale for weighing successive charges, in combination with a graduated chart having a plurality of columns, a cross-bar opposite said chart and crossing its columns, said parts movable the one relatively to the other parallel with the direction of said columns, and one of said parts adjustable relatively to the other, and the connection between such scale and such movable part, moving the latter relatively to the other part according to the weight of the charge carried by the scale, whereby the weights of successive charges can be recorded by marking in successive columns the successive positions of the bar and chart during weighing, and said parts can be adjusted to bring the bar opposite the zero-point of the chart for accuracy.

2. In registering-scales for weighing different quantities, a weighing-scale, in combination with a chart having a number of vertical columns, a bar crossing said chart and having a number of indicating-points corresponding to the number and location of such columns, means, identifying and distinguishing each column, said chart and bar movable the one relatively to the other, and a connection between the movable part and the scale, moving the former in correspondence with the movements of the scale, whereby, by marking on the chart the position of the bar, at the column corresponding to the charge being weighed, individual charges can be recorded.

3. In registering-scales for weighing different quantities, a frame $b$, a changeable chart $c$ carried thereby and having horizontal and vertical lines, a cross-bar $a'$ in front of said frame and having a number of holes corresponding to the vertical columns on the chart, said frame and bar relatively movable, and connected with the movable parts of a weighing-scale, in combination with such scale, whereby the frame and bar are relatively displaced corresponding to the different weights of the charges to be weighed, so that the weight can be marked on the chart by a marker pushed through the corresponding hole in the cross-bar, substantially as described.

In witness whereof I have hereunto signed my name in the presence of two subscribing witnesses.

OTTOCAR LINDEMANN.

Witnesses:
WILLIAM HAUPT,
HENRY HASPER.